March 28, 1961 F. G. F. BEHLES 2,976,956
SELF-ENERGIZING BRAKE SYSTEM
Filed Feb. 24, 1958 2 Sheets-Sheet 1

INVENTOR
FRANZ G.F. BEHLES

BY *Dicke and Craig*

ATTORNEYS

March 28, 1961 F. G. F. BEHLES 2,976,956
SELF-ENERGIZING BRAKE SYSTEM
Filed Feb. 24, 1958 2 Sheets-Sheet 2
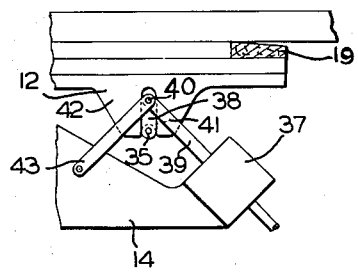
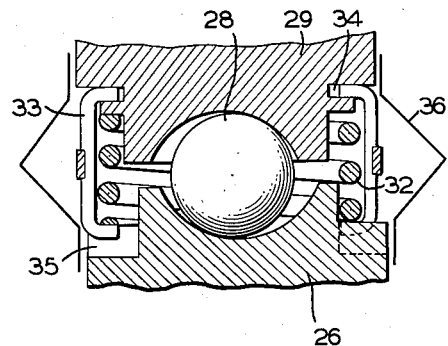
INVENTOR
FRANZ G. F. BEHLES
BY *Dicke and Craig*
ATTORNEYS

United States Patent Office 2,976,956
Patented Mar. 28, 1961

2,976,956

SELF-ENERGIZING BRAKE SYSTEM

Franz G. F. Behles, Stuttgart-Unterturkheim, Germany, assignor to Daimler-Benz Aktiengesellschaft, Stuttgart-Unterturkheim, Germany Filed Feb. 24, 1958, Ser. No. 716,920

Claims priority, application Germany Feb. 28, 1957

28 Claims. (Cl. 188—72)

The present invention relates to a self-energizing brake and is of particular significance for disk-type brakes of motor vehicles.

Recent developments in the brakes used nowadays have led to an abandonment of the self-energization of the brake force. Instead, the self-energization or amplification of the pedal force in recent designs and constructions is left to relatively expensive auxiliary brake devices.

The known types of brakes having self-energization have the property that the self-energization depends on the frictional value in the sense that with smaller frictional value the self-energization becomes smaller. This leads in practice to a considerable decreasing braking effect during continuous braking as well as to a relatively poor tracking, if, for example, the wheels on one vehicle side are exposed to rain whereas the others are protected thereagainst. On the other hand, with too high a friction value the self-energizing types of brakes are liable to lock, especially with cold brakes.

The present invention seeks to provide a solution for a brake having self-energization of the braking force in which the self-energization is adjustable or variable and the fluctuation in the friction value is automatically compensated for and equalized.

This problem is solved in accordance with the present invention in that for a relatively movable brake shoe, two actuating members are provided, and in that the first actuating member is so coordinated or operatively connected with this brake shoe that the direction of its effectiveness with respect to the brake surface remains always the same whereas the second actuating member is so coordinated or operatively connected with this brake shoe over a self-adjusting transmitting means that the direction of its effectiveness automatically adjusts itself in dependence on the frictional value.

In a construction according to the present invention, any fluctuation in the friction results in a change in the direction of effectiveness of the second actuating member which is operative as a yielding abutment member against the relatively movable brake shoe. As a result thereof, the component which is effective perpendicularly to the relatively movable brake shoe is automatically adjusted in the direction that with a decreasing frictional value the component increases. The self-energization is maintained in this manner automatically at practically the same value with fluctuations in the friction value or it changes in such a manner that it increases with a decreasing friction value.

Accordingly, it is an object of the present invention to provide a brake system for motor vehicles in which the self-energization of the brake actuating force is rendered independent of the friction value, for instance, of the brake lining.

Another object of the present invention resides in the provision of an automatic adjusting or equalization system which compensates for fluctuations in the friction value to maintain essentially constant the self-energization of the brake force.

Another object of the present invention is to provide a connection for the hand brake in such a manner that the hand brake is operative with the same self-energization as the foot brake and may, therefore, be used as a real emergency brake.

Still another object of the present invention resides in the provision of a disk brake system for motor vehicles in which the relatively movable brake shoe member is actuated by two actuating members which apply such a force thereto that the ratio of total brake force with respect to actuating force remains essentially constant.

These and other objects, features and advantages of the present invention will become more obvious from the following description when taken in connection with the accompanying drawing which shows, for purposes of illustration only, several embodiments in accordance with the present invention, and wherein:

Figure 5 is a partial cross-sectional view through a roller body arrangement in accordance with the present invention; and Figure 6 is a partial side view of a different embodiment of a brake system provided with a self-adjusting transmitting means in accordance with the present invention.

Figure 1:
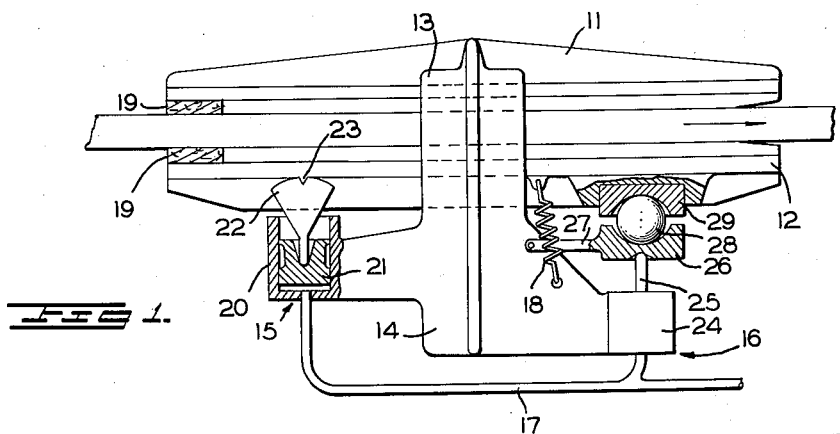
Figure 1 is a partial plan view of a disk brake in accordance with the present invention showing certain parts thereof in cross section to indicate the details thereof.

Referring now to the drawing, wherein like reference numerals are used throughout the various views to designate like parts, and more particularly to Figure 1, reference numeral 10 designates a brake disk which rotates during forward movement of the vehicle in the direction of the arrow. The brake disk 10 is disposed between a relatively stationary brake shoe 11 and a relatively movable brake shoe 12 adapted to be moved perpendicularly to the movement of brake disk 10 for purposes of actuation of the brake and also capable of being taken along a limited amount in the direction of movement of disk 10 by the latter. The relatively stationary brake shoe 11 extends with the arm 13 thereof beyond the brake disk 10 whereby the arm 13 simultaneously is constructed as support member 14 for the relatively movable brake shoe 12. Since such a construction is well known, the details thereof are dispensed with herein.

Two actuating members, generally designated by reference numerals 15 and 16, for the relatively movable brake shoe 12 are arranged at the support member 14. Both actuating members 15 and 16 are constructed as hydraulic pressure cylinders 20 and 24 of either the same or different cross section and are connected over line 17 with the master cylinder (not shown) of the brake installation. A return spring 18 is arranged appropriately at the relatively movable brake shoe 12 in such a manner that it is disposed at an angle or at an incline with respect to and closer to the actuating member 16. Both brake shoes 11 and 12 are provided with brake linings 19 of suitable construction as is well known in the art.

The actuating member, generally designated by reference numeral 15, is so arranged that the direction of its effectiveness, i.e., the direction of the actuating force produced thereby in relation to the brake shoe 12 always remains the same and is directed perpendicularly to the brake surface thereof. The actuating member, generally designated by reference numeral 15, consists of a pressure cylinder 20 with a piston 21. A sector-shaped pressure member 22 which abuts against the brake shoe 12 is supported within the piston 22 provided with a suitable bearing aperture. A nose portion 23 or a similar member at the brake shoe 12 constitutes a roller-type connection between the sector-shaped pressure member 22 and the brake shoe 12 in such a manner that upon movement of the brake shoe 12, when entrained by disk 10, the pressure member 22 rolls off along the brake shoe 12 and the point of contact of both parts remains always on or in alignment with the axis of the piston 21.

The actuating member generally designated by reference numeral 16 has more the effect of a yieldable abutment member or bearing. For that purpose, a hydraulic pressure cylinder 24 of the same or of larger cross section than the hydraulic pressure cylinder 20 is provided. The piston rod 25 connected with the piston accommodated within the pressure cylinder 24 does not act directly on the brake shoe 12 but instead over a self-adjusting means, for example, over a roller socket member 26 which is pivotally connected at the support member 14 by means of a guide arm 27 possibly under a right angle with respect to the piston rod 25. A second, preferably similarly constructed and shaped roller socket member 29 is arranged at the brake shoe 12 and a ball member 28 is disposed between both socket members 26 and 29. Both socket members 26 and 29 may be constructed in a semispherical manner. The radius thereof is only slightly larger than the radius of the ball member 28 in order to obtain adjusting paths which are as short as possible.

A change in the direction of the self-energizing force S on the brake surface is made possible by the roller socket members 26 and 29. If the brake shoe 12 during the braking operation is taken along in the direction of rotation by the brake disk 10 by an amount depending on the friction value of the brake linings, then a predetermined angle of attack of the ball member 28 in the socket members 26 and 29 is always automatically adjusted. If the friction value $\eta$ and therewith the friction force $\eta \cdot P$ decreases, then the ball member 28 is moved onto the more flat part of the socket members 26 and 29 and the self-energization is thereby correspondingly large. The socket members 26 and 29 may also be constructed, for example, as ellipsoids or other bodies of revolution. One of the two socket members 26 and 29 may also be arched or curved in only one of the planes thereof.

Figure 2:
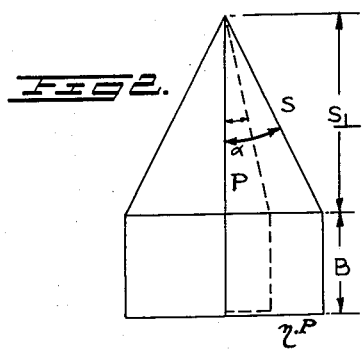
Figure 2 is a force diagram for the brake system according to Figure 1.

Figure 2 indicates the force diagram of the brake arrangement of Figure 1. The entire abutment pressure of the brake shoe is thereby designated by P and consequently $\eta \times P$ designates the friction force absorbed by the guide arm 27 if $\eta$ represents the friction value. Reference character B indicates the actuating force of the actuating member 15. $S_1$ is the component of the self-energizing force S directed perpendicular to the brake disk which is determined by the actuating member 16 and which consists of $S_1$ and the friction force $\eta P$. The force S is effective on the brake shoe 12 under an angle $\alpha$ determined by the self-adjusting means, for example, of the ball member 28 in the socket members 26 and 29. As may be clearly seen from the diagram of Figure 2, with the friction value $\eta$ becoming smaller a more acute or smaller angle $\alpha$ is automatically adjusted by the arrangement according to Figure 1 whereby the ratio of abutment pressure P to actuating force B remains constant. The ratio of the friction force $\eta \cdot P$ to the actuation force B which is decisive for the brake action is thereby proportional to $\eta$.

Figure 3:
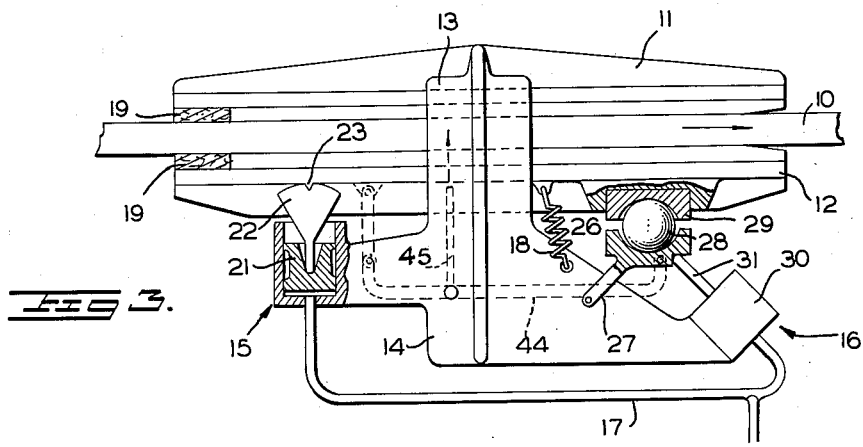
Figure 3 is a partial plan view of a different embodiment of a disk brake in accordance with the present invention, again showing certain parts in cross section to indicate the details thereof.

Figure 3 illustrates a modified embodiment of a brake disk arrangement in accordance with the present invention similar to Figure 1. The arrangement of the brake disk 10 and brake shoes 11 and 12 with respect to each other is the same as in Figure 1. However, the second actuating member 16 of Figure 3 which is constituted in this case by the pressure cylinder 30 is disposed at an angle or inclination to the pressure cylinder 20 of the first actuating member 15 which is constructed in a manner identical to the one of Figure 1. The piston rod 31 connected with the piston disposed within the pressure cylinder 30 acts over an adjusting means, for example, over a ball and socket connection consisting of ball member 28 and socket members 26 and 29 on the relatively movable brake shoe 12. A lever 44 is arranged as a further actuating member which may be connected with the hand brake cable 45.

Figure 4:
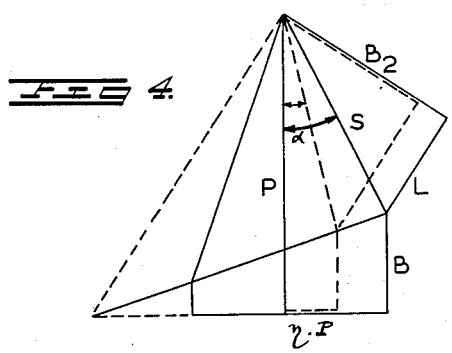
Figure 4 is a force diagram for the brake system shown in Figure 3.

The arrangement of the embodiment illustrated in Figure 3 produces a system which is even less sensitive to the prevailing friction value existing in the brake system. The force relations are clearly illustrated in Figure 4 in which the force diagram is shown. The actuating force $B_2$ of the inclined cylinder 30 thereby remains at a fixed ratio to the actuating force B of the straight cylinder 20. The self-energizing force S is composed of force $B_2$ and the guide force L of the guide arm 27. With a smaller friction value, the angle of attack $\alpha$ becomes smaller; the perpendicular components of the self-energizing force S thereby become larger in relation to the abutment pressure; and the ratio of actuating force B to abutment pressure becomes smaller. Consequently, the ratio of friction force $\eta P$ to the actuating force B changes less than the friction value $\eta$. Furthermore, as is quite clearly visible from the diagram of Figure 4, the self-energization for driving in the rearward direction is greater than during forward drives. This property of the brake facilitates starting while on a hill.

Figure 5 shows a roller body arrangement in accordance with the present invention which maintains the desired angle of attack of the ball member 28 during non-use of the brake. Between the two socket members 26 and 29 there is arranged a pre-tensioned spring 32 which is retained by the clamps 33. The clamps 33 engage in an annular gap or annular recess 34 at the socket member 29 and in milled-out or notched recesses 35 arranged along the periphery of the socket member 26. The spring 32 forces the socket members 26 and 29 apart from each other until the clamp members 33 take over and absorb the spring force while the return spring 18 acting in the opposite direction retains the socket members 26 and 29 in this position. Of the two socket members 26 and 29, the socket member 26 is arched or curved in only one plane. A bellows 36 of any suitable construction and suitably secured to the socket members 26 and 29 protects the same against dirt.

According to the embodiment of Figure 6, an intermediate lever 38 is arranged between the pressure cylinder 37 and the brake shoe 12 which is effective as self-adjusting means, the intermediate lever 38 being pivotally connected at the piston rod 39 and engaging by means of a bolt member 40 a corresponding recessed portion 41 provided in a nose portion 42 at the brake shoe 12. The intermediate lever 38 also adjusts itself automatically to the corresponding angle with respect to the brake surface. The guide member 43 assures that the piston rod 41 and the piston connected therewith and arranged within the pressure cylinder 37 does not need to absorb any lateral or side forces.

The automatic adjustment of the relatively movable brake shoe with worn brake linings may take place in all of the embodiments illustrated in the present application by arrangements of a known construction either in the actuating cylinders or pressure lines.

While I have shown and described several embodiments in accordance with the present invention, it is understood that the same is not limited thereto but is susceptible of many changes and modifications within the spirit and scope of the present invention and I, therefore, intend to cover all such changes and modifications as encompassed by the appended claims.

I claim:

1. A self-energizing brake for vehicles comprising relatively stationary brake shoe means and relatively movable brake shoe means, said movable brake shoe means being rotatable, a movable member to be braked and disposed between said brake shoe means, said brake shoe means being provided with friction means forming a braking surface adapted to frictionally engage said member, and means for actuating said relatively movable brake shoe means to obtain a braking effect on said movable member including first actuating means transmitting braking force to said movable member in a constant direction and second actuating means including self-adjusting variable force transmitting means for transmitting the actuating force from said second actuating means to said relatively movable brake shoe mean, said variable force-transmitting means including means to transmit said actuating force in directions dependent upon the friction value of said friction means.

2. A self-energizing brake according to claim 1, wherein said movable member is a brake disk disposed between a relatively stationary brake shoe and a relatively movable brake shoe, and wherein said first and second actuating means include two hydraulic pressure cylinders.

3. A self-energizing brake according to claim 2, wherein said movable brake shoe is constructed as a segment of a disk.

4. A self-energizing brake according to claim 1, wherein said first and second actuating means include pressure cylinders operatively connected with said relatively movable brake shoe means in such a manner that the direction of movement of the pistons thereof in said pressure cylinders is perpendicular to said brake shoe.

5. A self-energizing brake according to claim 1, wherein said first and second actuating means include pressure cylinders, and wherein one of said pressure cylinders has an axis inclined to the other pressure cylinder and to said relatively movable brake shoe means.

6. A self-energizing brake according to claim 5, wherein said one pressure cylinder forms part of said second actuating means including said variable force transmitting means.

7. A self-energizing brake according to claim 1, wherein said self-adjusting variable force transmitting means includes roller body means cooperating with rolling surfaces of varying inclination coordinated to said second actuating means and said relatively movable brake shoe means.

8. A self-energizing brake according to claim 7, wherein said second actuating means includes a pressure cylinder accommodating a piston having a piston rod and wherein said roller body means is a ball member, and wherein curved socket members are connected with said relatively movable brake shoe means and said piston rod.

9. A self-energizing brake according to claim 8, wherein at least one of the two socket members is constructed as a semi-spherically shaped socket having a radius only slightly larger than the radius of said ball member.

10. A self-energizing brake according to claim 1, wherein self-adjusting variable force transmitting means includes a lever, and wherein said second actuating means includes a pressure cylinder having a piston provided with a piston rod, said lever being pivotally connected with said relatively movable brake shoe means and with said piston rod.

11. A self-energizing brake according to claim 1, wherein said relatively stationary brake shoe means includes a support member, and wherein said second actuating means includes a pressure cylinder accommodating therein a piston with a piston rod, said pressure cylinder being supported at said supporting member, and further comprising guide means operatively connected with said piston rod and pivotally supported at said supporting member.

12. A self-energizing brake according to claim 11, wherein said guide means extends essentially perpendicularly to the axis of said pressure cylinder.

13. A self-energizing brake according to claim 12, wherein said self-adjusting transmitting means includes a socket member operatively connected with said piston rod and wherein said guide means is rigidly connected with said socket member.

14. A self-energizing brake according to claim 1, wherein said first and second actuating means include two pressure cylinders having different piston cross sections whereby the ratio of actuating force to self-energizing force is determined by the ratio of the effective piston cross sections.

15. A self-energizing brake according to claim 1, further comprising mechanical actuating means operatively connected with said relatively movable brake shoe means to actuate said relatively movable brake shoe means.

16. A self-energizing brake according to claim 15, wherein said mechanical actuating means is additional to the hydraulic brake system and constitutes an emergency brake.

17. A self-energizing brake according to claim 16, wherein the points of attack of said mechanical actuating means at said relatively movable brake shoe means are disposed as close as possible adjacent to the first and second actuating means.

18. A self-energizing brake according to claim 17, wherein said mechanical actuating means includes actuating members, and wherein the ratio of the actuating force of the brake to the self-energizing force is determined by the effective leverage of said actuating members with respect to the point of attack of the brake force transmitting member.

19. A self-energizing brake according to claim 1, wherein said first actuating means includes a pressure cylinder accommodating a piston and further comprising a sector-shaped pressure member operatively connecting said piston with said relatively movable brake shoe means.

20. A self-energizing brake according to claim 1, wherein said self-adjusting transmitting means is connected with at least one of the two parts consisting of said second actuating means and said relatively movable brake shoe means that it becomes effective only during a change in the friction value of said friction means.

21. A self-energizing brake according to claim 1, wherein said self-adjusting transmitting means includes two members, and connecting means for resiliently connecting at least one of said two members with the other member and with relatively movable brake shoe means such that the mutual position of said socket members with respect to each other changes only upon changes in the friction value of said friction means.

22. A self-energizing brake according to claim 21, wherein both of said members are resiliently and dampingly connected with the respective parts coordinated thereto.

23. A self-energizing brake according to claim 1, wherein said self-adjusting transmitting means includes two socket members, and connecting means for dampingly connecting at least one of said two socket members with the other socket member and with relatively movable brake shoe means such that the mutual position of said socket members with respect to each other changes only upon changes in the friction value of said friction means.

24. A self-energizing brake according to claim 1, wherein said self-adjusting transmitting means includes a lever, and connecting means for resiliently operatively connecting said lever with at least one of the two parts consisting of said second actuating means and said relatively movable brake shoe means to bring the self-adjusting feature thereof into effect only upon the occurrence of a change in the friction value of said friction means.

25. A self-energizing brake according to claim 1, wherein said self-adjusting transmitting means includes two socket members and spring means between said two socket members including clamping means to limit the effectiveness of said spring means.

26. A self-energizing brake according to claim 25, further comprising protective bellows means surrounding said socket members and said spring means as well as said clamping means to protect the same against dirt.

27. A self-energizing brake for vehicles comprising relatively stationary brake shoe means and relatively rotatively movable brake shoe means, a movable member to be braked and disposed between said two brake shoe means, said brake shoe means being provided with friction means forming a braking surface adapted to frictionally engage said member, and means for actuating said relatively movable brake shoe to obtain a braking effect on said movable member including self-adjusting variable force transmitting means for transmitting the actuating force from said second actuating member to said relatively movable rake shoes, said variable force-transmitting means including means to transmit said actuating force in directions dependent on the friction value of said friction means.

28. A self-energizing brake for vehicles comprising braking structure including movable brake shoe means, a movable member to be braked and disposed adjacent said movable brake shoe means, said movable brake shoe means being rotatable and movable in directions toward and away from said movable member, said movable brake shoe means being provided with friction means forming a braking surface adapted to frictionally engage said movable member, and means for actuating said movable brake shoe means to obtain a braking effect on said movable member including first actuating means including means for transmitting braking force to said movable member in a constant direction and further including second actuating means comprising self-adjusting variable force-transmitting means for transmitting the actuating force from said second actuating means to said movable brake shoe means, said variable force-transmitting means including means to transmit said actuating force in directions dependent on the friction value of said friction means.

References Cited in the file of this patent

UNITED STATES PATENTS

| | | |
|---|---|---|
| 1,806,151 | Dick | May 19, 1931 |
| 2,206,976 | Rossmann | July 9, 1940 |
| 2,419,113 | Bricker | Apr. 15, 1947 |
| 2,478,333 | Sneed | Aug. 9, 1949 |
| 2,655,230 | Buyze | Oct. 13, 1953 |
| 2,794,521 | Morrison | June 4, 1957 |